United States Patent
Sato et al.

(10) Patent No.: US 7,841,014 B2
(45) Date of Patent: Nov. 23, 2010

(54) CONFIDENTIAL INFORMATION PROCESSING METHOD, CONFIDENTIAL INFORMATION PROCESSOR, AND CONTENT DATA PLAYBACK SYSTEM

(75) Inventors: Tomoya Sato, Nara (JP); Makoto Fujiwara, Kyoto (JP)

(73) Assignee: Panasonic Corporation, Osaka (JP)

( * ) Notice: Subject to any disclaimer, the term of this patent is extended or adjusted under 35 U.S.C. 154(b) by 967 days.

(21) Appl. No.: 11/659,000

(22) PCT Filed: Sep. 21, 2005

(86) PCT No.: PCT/JP2005/017377

§ 371 (c)(1),
(2), (4) Date: Jan. 31, 2007

(87) PCT Pub. No.: WO2006/035347

PCT Pub. Date: Mar. 30, 2006

(65) Prior Publication Data
US 2009/0013183 A1    Jan. 8, 2009

(30) Foreign Application Priority Data
Sep. 21, 2004   (JP)   .............................. 2004-272863

(51) Int. Cl.
*G06F 21/00* (2006.01)
(52) U.S. Cl. ........................... 726/29; 726/30; 713/155; 713/171; 705/51; 705/57
(58) Field of Classification Search .................. 713/155, 713/171; 705/51, 57; 726/29, 30
See application file for complete search history.

(56) References Cited

U.S. PATENT DOCUMENTS

2003/0070083 A1   4/2003  Nessler
2004/0059928 A1   3/2004  Fujiwara et al.

(Continued)

FOREIGN PATENT DOCUMENTS

EP         1 146 685 A2    10/2001

(Continued)

OTHER PUBLICATIONS

European Search Report issued in European Patent Application No. 05785734.4-2212, mailed Mar. 5, 2010.

*Primary Examiner*—Michael Pyzocha
*Assistant Examiner*—Paul Callahan
(74) *Attorney, Agent, or Firm*—McDermott Will & Emery LLP

(57) ABSTRACT

In order to maintain the confidentiality of information at a high level even in cases where a confidential information processor in which multiple types of decryption sequences are applicable is used, decryption is performed according to the value of content decryption information 304. If the value of the content decryption information 304 is "0", an encrypted content key 309 is decrypted with a selected authentication intermediate key 312 and encrypted contents 310 are decrypted with a content key 305. On the other hand, if the value of the content decryption information 304 is other than "0", the selected authentication intermediate key 312 is converted by performing an arithmetic operation using that value, thereby generating a conversion intermediate key 315. An encrypted domain key 316 is decrypted with the conversion intermediate key 315, the encrypted content key 309 is decrypted with a domain key 306, and then the encrypted contents 310 are decrypted with a content key 305.

13 Claims, 17 Drawing Sheets

U.S. PATENT DOCUMENTS

2007/0300078 A1* 12/2007 Ochi et al. .................. 713/189

FOREIGN PATENT DOCUMENTS

| | | |
|---|---|---|
| JP | 2000-112348 | 4/2000 |
| JP | 2004-94778 | 3/2004 |
| JP | 2004-96666 | 3/2004 |
| JP | 2004-194271 | 7/2004 |

* cited by examiner

CONFIDENTIAL INFORMATION PROCESSING METHOD, CONFIDENTIAL INFORMATION PROCESSOR, AND CONTENT DATA PLAYBACK SYSTEM

RELATED APPLICATIONS

This application is the U.S. National Phase under 35 U.S.C. §371 of International Application No. PCT/JP2005/017377, filed on Sep. 21, 2005, which in turn claims the benefit of Japanese Application No. 2004-272863, filed on Sep. 21, 2004, the disclosures of which Applications are incorporated by reference herein.

TECHNICAL FIELD

The present invention relates to a confidential information processing method for decrypting, by a specified host system owned by each user, encrypted contents stored by the user in a target device via, e.g., electronic delivery or the like, and a confidential information processing method for storing, in the target device, contents encrypted by the specified host system owned by the user. The present invention also relates to confidential information processors used in the confidential information processing methods.

BACKGROUND ART

Contents that should be protected from illegal copies or external leakage, such as copyrighted works and individual information, for example, are stored in a target device in an encrypted state. The stored encrypted contents can only be decrypted by a host system that has succeeded in an authentication process performed between the host system and the target device. This prevents unauthorized host systems from performing illegal copies, leakage and the like. The target device herein is a storage medium such as an SD card (memory card), for example, or a device including such a storage medium. And the host system herein is a semiconductor integrated circuit that reads or writes data from or into a target device, a set system including such a semiconductor integrated circuit, or a content delivery system that delivers contents to a target device.

To be specific, the decryption described above is performed as follows. The host system reads an encrypted content key stored together with encrypted contents in the target device and decrypts the encrypted content key using an intermediate key generated in an authentication process, for example. Next, with the content key obtained by the decryption, the encrypted contents are decrypted, whereby the contents in plaintext form are obtained by the two-step decryption process.

Also, in order to allow only specified users to use electronically delivered encrypted contents, for example, a domain key or the like may be used. Specifically, the host system decrypts an encrypted domain key using the intermediate key, decrypts the encrypted content key with the obtained domain key, and then decrypts the encrypted contents using the obtained content key, whereby the contents in plaintext form are obtained by the three-step decryption process.

However, if the decrypted domain key, content key, or the like can be obtained by observing the processes mentioned above, the confidentiality of the contents decreases significantly. A technique has been therefore known which enables encryption processes, decryption processes and the like to be performed only within a semiconductor integrated circuit so that a content key and the like used during the processes cannot be obtained from outside the semiconductor integrated circuit (see, for example, Patent Document 1).

Patent Document 1: Japanese Laid-Open Publication No. 2004-096666

DISCLOSURE OF THE INVENTION

Problem that the Invention Intends to Solve

Nevertheless, even in cases where decryption processes and the like are performed only in a semiconductor integrated circuit as described above, if multiple types of decryption sequences are applicable as in the above-mentioned two-stage and three-stage decryption processes, the confidentiality of information may not be protected. For example, if an encrypted domain key is supplied to a semiconductor integrated circuit so as to make the semiconductor integrated circuit perform a two-stage decryption process, it is possible to make the semiconductor integrated circuit externally output the content key in plaintext form. Therefore, there has been a problem with the conventional target device, host system, and other confidential information processors in that they have difficulty in keeping the confidentiality of information at high level.

Means for Solving the Problem

It is therefore an object of the present invention to maintain the confidentiality of information at a high level, even if a confidential information processor in which multiple types of decryption sequences are applicable is used.

In order to achieve the above object, an inventive confidential information processing method for decrypting, in a host system, encrypted content data obtained by encryption of content data with a content key and stored in a target device includes: the mutual authentication step of performing mutual authentication between the host system and the target device; and the decryption step of, when the mutual authentication has succeeded, decrypting the encrypted content data in accordance with decryption information and the content key, the decryption information indicating a procedure for the decryption of the encrypted content data and relating to contents of an arithmetic operation performed in the decryption of the encrypted content data.

Then, the decryption procedure and the arithmetic operation contents performed in the decryption are always associated with each other, whereby fraudulent acquisition of data by execution of an unauthorized decryption procedure can be prevented.

Effects of the Invention

According to the present invention, it is possible to maintain the confidentiality of information at a high level, even if a confidential information processor in which multiple types of decryption sequences are applicable is used.

BRIEF DESCRIPTION OF DRAWINGS

FIG. 1 is a block diagram showing the structure of a confidential information processor according to a first embodiment and the like.

FIG. 2 is an explanatory view showing storage regions in a target device 101 according to the first embodiment and the like.

FIG. 3 is an explanatory view showing storage regions in the target device 101 according to the first embodiment and the like.

BEST MODE FOR CARRYING OUT THE INVENTION

Figure 1:
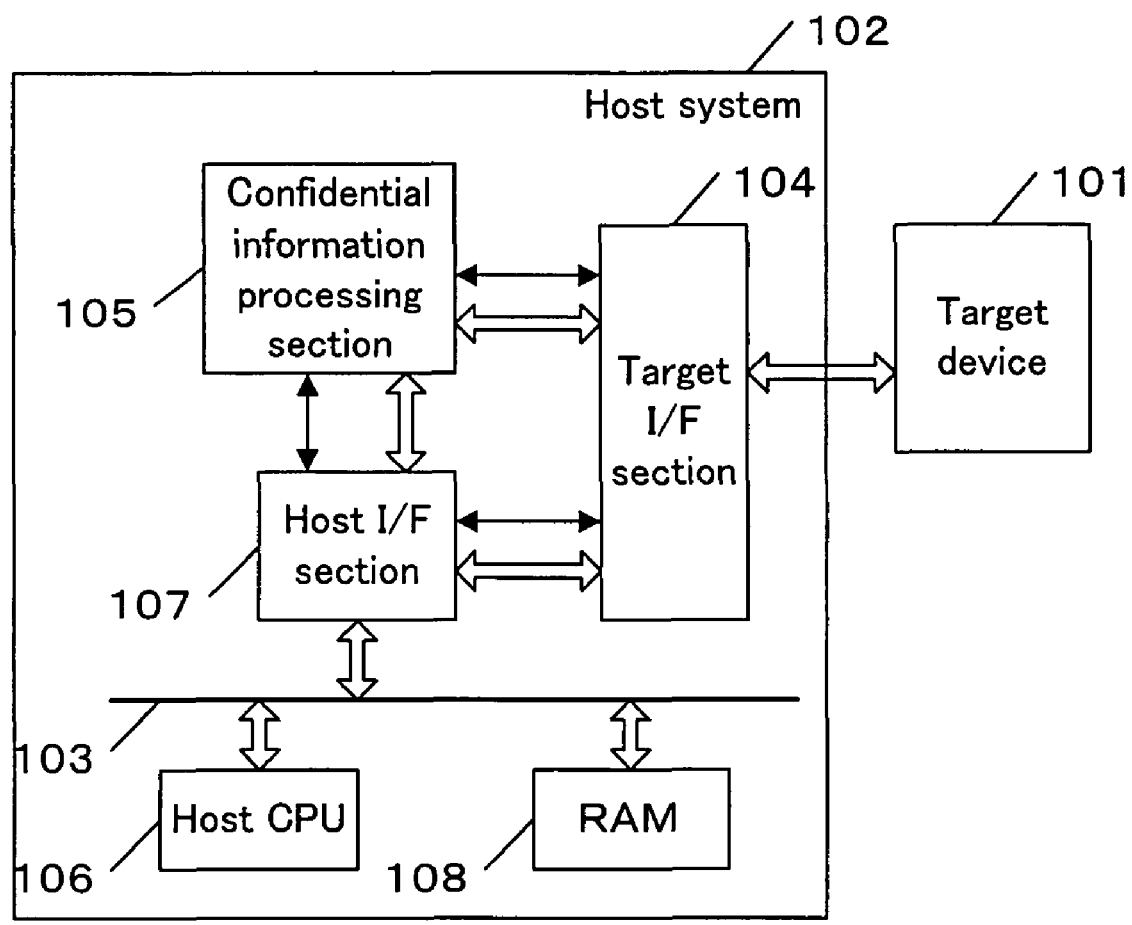

Hereinafter, preferred embodiments of the present invention will be described in detail with reference to the accompanying drawings. In the following embodiments, the components having substantially the same functions are identified by the same reference numerals and descriptions thereof will be thus omitted herein.

First Embodiment of the Present Invention

As a first embodiment of the present invention, an example of a confidential information processor (system) will be described, which selectively performs decryption of encrypted contents, in which a two-step decryption process including decryption of an encrypted content key is carried out, and decryption of encrypted contents, in which a three-step decryption process including decryption of an encrypted domain key and an encrypted content key is carried out. This confidential information processor (system) is structured as shown in FIG. 1, for example, in which a target device 101 is connected to a host system 102.

Which key will be used to decrypt the encrypted content key (or which key will be used to encrypt the content key) is determined in accordance with, e.g., the characteristics of the contents to be utilized. The encrypted content key and the encrypted contents, encrypted with the determined key, are stored in the target device 101. The domain key obtained by decryption of the encrypted domain key is a key which is, for example, uniquely defined for only specific groups or users and delivered to them by electronic delivery or the like for their use. The domain key is defined in this manner and used as a key for encrypting the content key, whereby it is possible to allow only the specified host systems owned by the users to decrypt the encrypted contents stored in the target device.

(Target Device 101)

Figure 2:
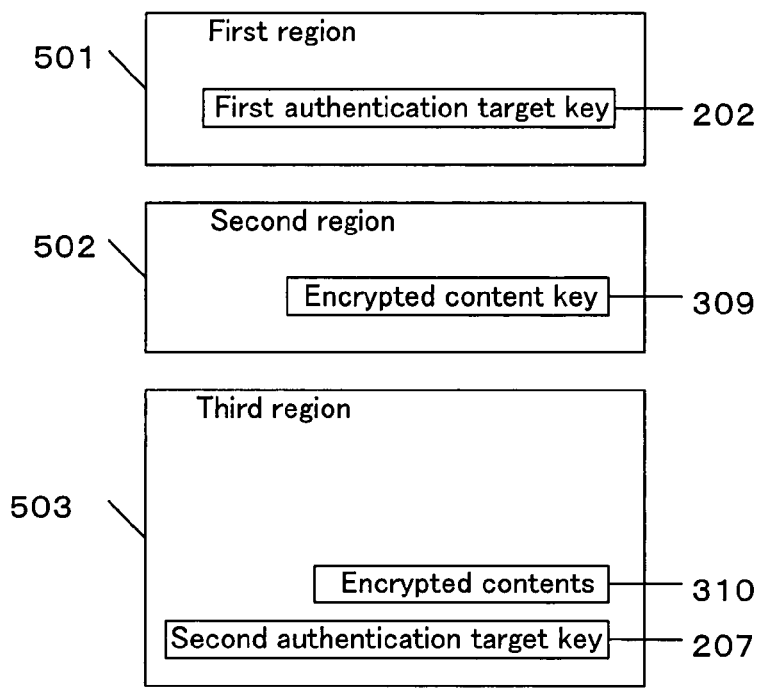
Figure 3:
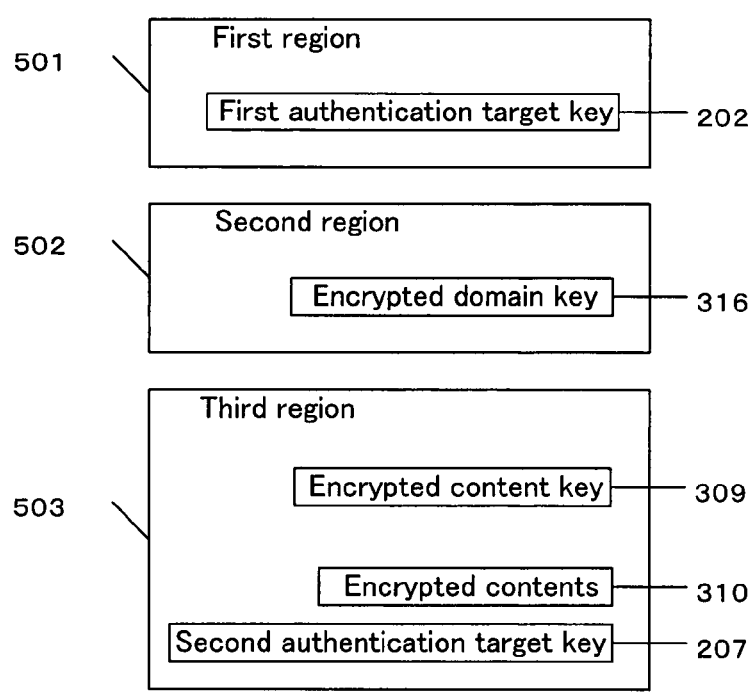

As the target device 101, a memory card called an SD card, for example, is used, and data containing confidential information is stored in the target device 101. In the target device 101, first to third regions 501 to 503 are provided as shown in FIGS. 2 and 3, for example.

The first region 501 is accessed when authentication is performed between the target device 101 and the host system 102, and a first authentication target key 202 is stored in the first region 501.

The second region 502 can be accessed only when the authentication between the host system 102 and the target device 101 has succeeded. In cases where encrypted contents 310 that are to be decrypted in two steps are stored, an encrypted content key 309 is stored in the second region 502. On the other hand, in cases where encrypted contents 310 that are to be decrypted in three steps are stored, an encrypted domain key 316 is stored in the second region 502.

The third region 503 is a region that can be accessed freely. The encrypted contents 310 and a second authentication target key 207 are stored in the third region 503. That is, in the third region 503, overwrite of encrypted contents 310 delivered by electronic delivery or the like is possible, and as will be described later, when the confidentiality of an authentication host key 201 has been broken, the second authentication target key 207 also delivered by electronic delivery or the like can be additionally written in the third region 503 (although deletion of the second authentication target key 207 is not possible). In cases where encrypted contents 310 that are to be decrypted in three steps are stored, the encrypted content key 309 is also stored in the third region 503. It should be noted that even in the case of the three-step decryption, the encrypted content key 309 may be stored in the second region 502 so that the confidentiality of the encrypted content key 309 can be kept at a high level as well as the encrypted domain key 316. Alternatively, a plurality of target devices 101 may be provided so that each information can be stored in a separate target device 101.

(Structure of the Host System 102)

The host system 102 reads/writes confidential information from/into the target device 101. Specifically, the host system 102 includes, for example, an internal bus 103, a target I/F (interface) section 104, a confidential information processing section 105, a host CPU 106, a host IN section 107, and a RAM 108. The target I/F section 104 inputs/outputs data from/into the target device 101. The confidential information processing section 105 performs decryption of confidential information and an authentication process in accordance with a given sequence. The host CPU 106 starts the given sequence for the confidential information processing section 105. The host I/F section 107 inputs/outputs data from/into the host CPU 106 and the confidential information processing section 105 and also inputs/outputs data from/into the target device 101 through the target I/F section 104. The RAM 108 serves as a work area into which the host CPU 106 and the confidential information processing section 105 temporarily store data for their operation.

(Structure of the Confidential Information Processing Section 105 in the Host System 102)

Figure 4:
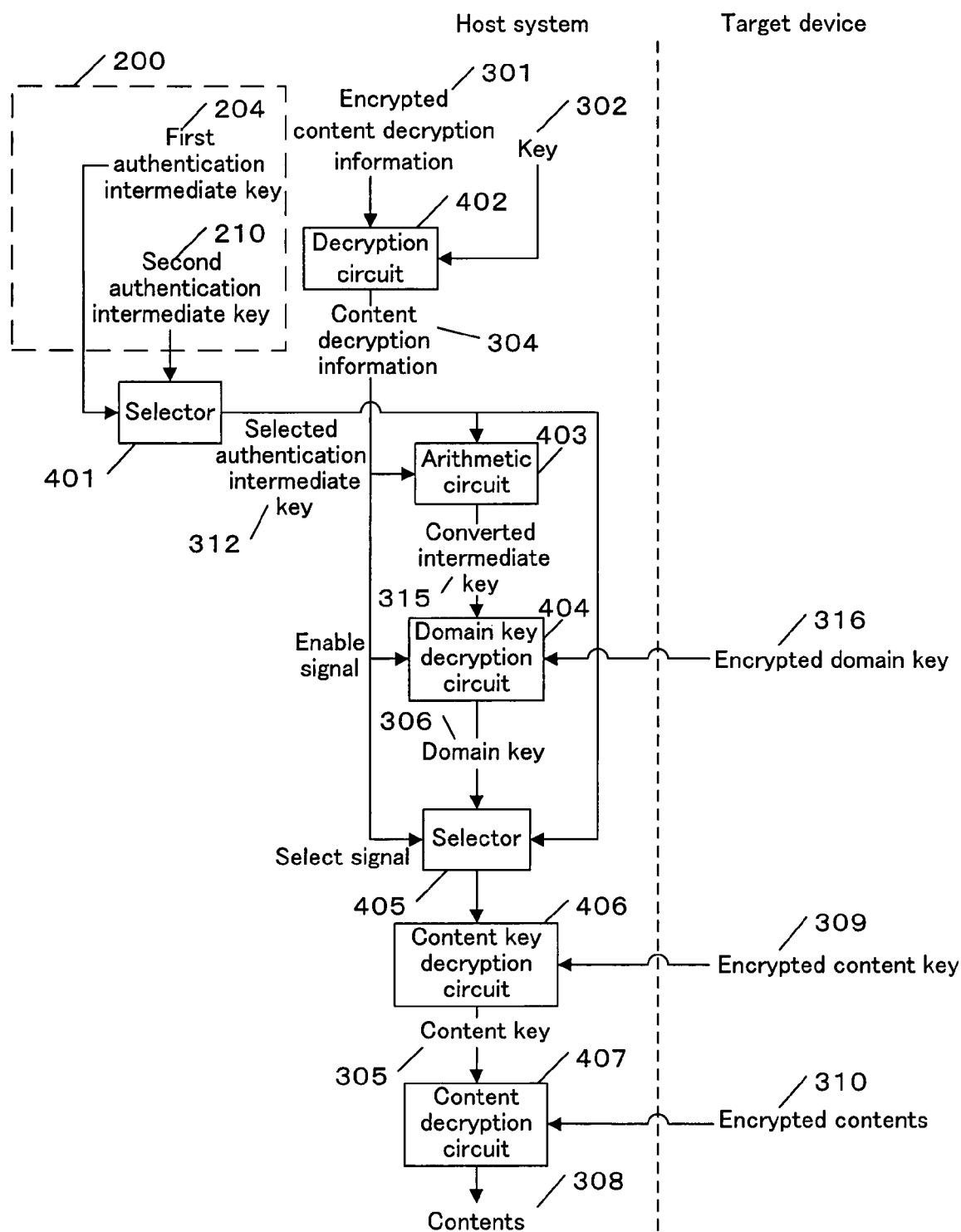
FIG. 4 is a block diagram showing the structure of a confidential information processing section 105 according to the first embodiment.

As shown in FIG. 4, for example, the confidential information processing section 105 includes an authentication section 200, a selector 401, a decryption circuit 402, an arithmetic circuit 403, a domain key decryption circuit 404, a selector 405, a content key decryption circuit 406, and a content decryption circuit 407.

The host CPU 106 starts the operation of the confidential information processing section 105. However, the confidential information processing section 105 is hidden hardware, and after started, the confidential information processing section 105 only performs a predetermined sequence whose security is ensured or which does not require much security. That is, the structure shown in FIG. 4 is hidden hardware in the semiconductor integrated circuit and the processing sequences thereof cannot be changed by access from the control section or the like. Therefore, the host CPU and the like cannot control which data is decrypted using the decryption circuits 404, 406, and 407 and the like, for example. The host CPU only starts the confidential information processing section so that the confidential information processing section will perform one of the sequences.

(Operation of the Confidential Information Processor: Authentication Process)

Figure 5:
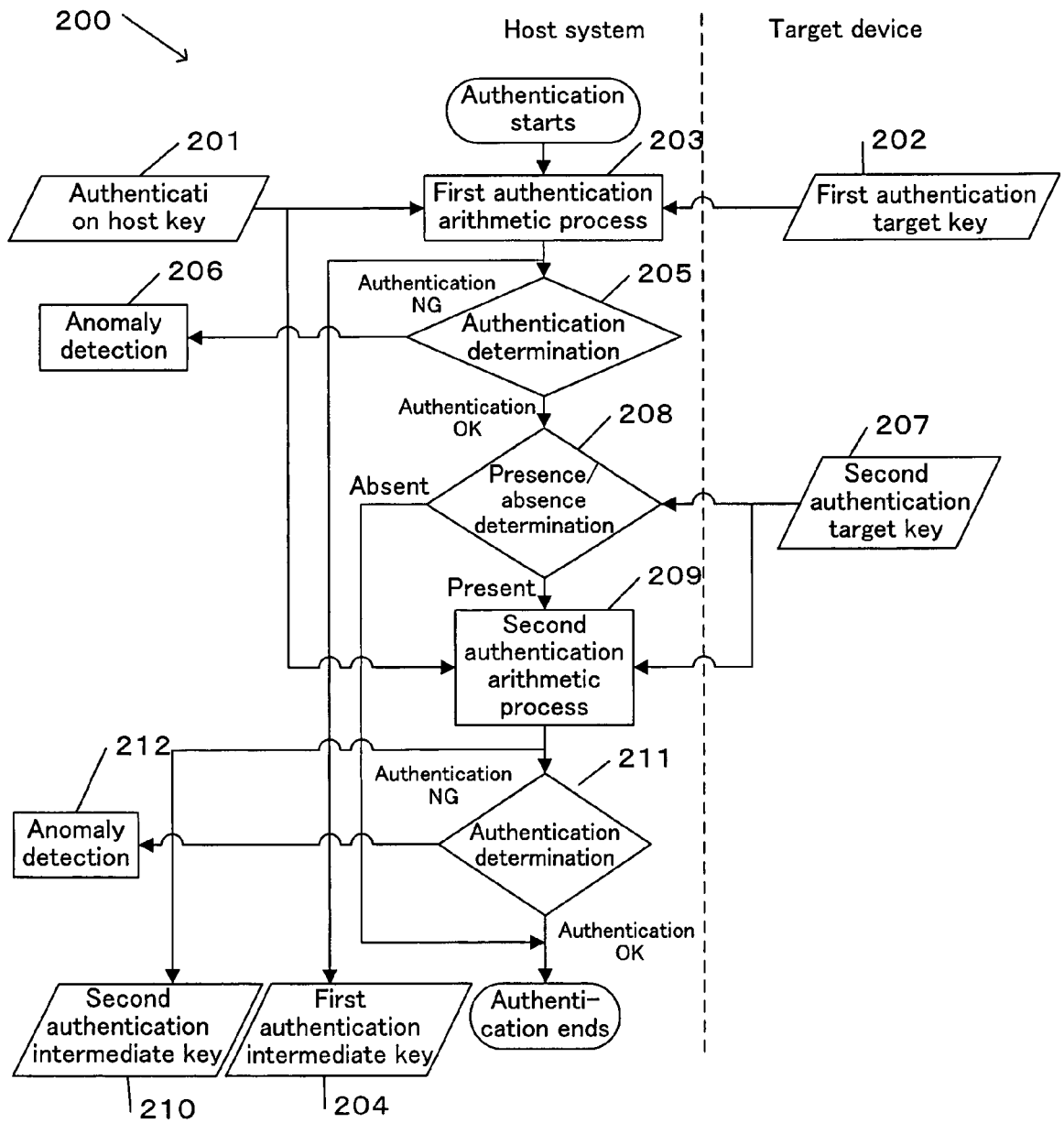
FIG. 5 is a flow chart showing an authentication process according to the first embodiment.

The encrypted contents 310 stored in the target device 101 are decrypted as follows. First, an authentication process such as shown in FIG. 5 is performed between the target device 101 and the host system 102. More specifically, when writing or reading of confidential information is performed between the target device 101 and the host system 102, authentication must be performed between the target device 101 and the host system 102. After the authentication has succeeded, the host system 102 reads the confidential information from the target device 101 through the target I/F section 104, decrypts the confidential information using the confidential information processing section 105, and uses the obtained information.

The authentication section 200 in the confidential information processing section 105 first receives, e.g., an authentication host key 201 established in the confidential information processing section 105 (e.g., a key uniquely established for each confidential information processing section 105) and a first authentication target key 202 read from the target device 101 and carries out a first authentication process 203. The first authentication process 203 contains plurality of functions including one-way functions. In a case where the authentication has succeeded, a first authentication intermediate key 204 having a value other than "0" is generated. On the other hand, in a case where the authentication has failed, a value of "0" is generated. When the first authentication process is completed, the generated first authentication intermediate key 204 or the value "0" is stored in an authentication intermediate key storage area (not shown) in the confidential information processing section 105 in the host system 102, while an authentication determination 205 is made.

In the authentication determination 205, it is determined whether or not the output of the first authentication process 203 is "0". When it is "0", the host system determines that this access is fraudulent and performs an anomaly detection process 206 without performing the subsequent processes.

In the case of the first authentication process 203 having succeeded, the authentication process may be completed so that a decryption process or the like can be performed. In this embodiment, however, the following process is performed further so as to prevent unauthorized decryption or the like even in cases where the confidentiality of the authentication host key 201 has been broken. More specifically, when it is detected that the confidentiality of the authentication host key 201 has been broken, a second authentication target key 207 and a new encrypted content key 309 (and an encrypted domain key 316, as necessary) are stored in the target device 101 by electronic delivery via a network or the like. (Or in the case of delivery of new encrypted content data, a second authentication target key 207 and the like are also delivered together with the new encrypted content data.) The second authentication target key 207 is generated in such a manner that authentication between the second authentication target key 207 and the authentication host key 201 whose confidentiality has not been broken will succeed, but authentication between the second authentication target key 207 and the authentication host key 201 whose confidentiality has been broken will fail. Therefore, even if the first authentication process 203 has fraudulently succeeded in the host system 102 having the authentication host key 201 whose confidentiality has been broken, authentication between that authentication host key 201 and the second authentication target key 207 eventually fails so that the use of the host system having the authentication host key 201 whose confidentiality has been broken is nullified.

Specifically, when the first authentication process 203 has succeeded, the confidential information processing section 105 then makes a presence/absence determination 208 as to whether or not the second authentication target key 207 is present in the target device 101. If the second authentication target key 207 is not present in the target device, a second authentication process 209 does not need to be performed. Therefore, the authentication is considered to have been successful, and the authentication process is completed.

If the second authentication target key 207 exists in the target device, the second authentication target key 207 is read from the target device and the second authentication process 209 is performed. The second authentication process 209 is similar to the first authentication process 203. In a case where the authentication has succeeded, a second authentication intermediate key 210 having a value other than "0" is generated, and in a case where the authentication has failed, a value of "0" is generated. And the second authentication intermediate key 210 or the value "0" is stored in the authentication intermediate key storage area. Further, an authentication determination 211 similar to the authentication determination 205 is made, and if the output of the second authentication process 209 is "0", an anomaly detection process 212 is performed.

The first and second authentication intermediate keys 204 and 210 each generated when the authentication has succeeded are different from each other, because they are generated from different keys, i.e., the first and second authentication target keys 202 and 207, respectively. However, the results obtained by decryption of the newly delivered encrypted domain key 316 or encrypted content key 309 are the same as those obtained by decryption of the previous encrypted domain key 316 or encrypted content key 309.

In each of the authentication processes described above, in the case of the successful authentication, the generated data is retained in the confidential information processing section 105. More specifically, when the second authentication process 209 has not been performed, only the first authentication intermediate key 204 is retained in the confidential information processing section 105 (and the initial value "0", for example, is retained as the second authentication intermediate key 210). When the second authentication process 209 has been performed, the first authentication intermediate key 204 and the second authentication intermediate key 210 are held in the confidential information processing section 105.

(Operation of the Confidential Information Processor: Decryption Process)

Figure 6:
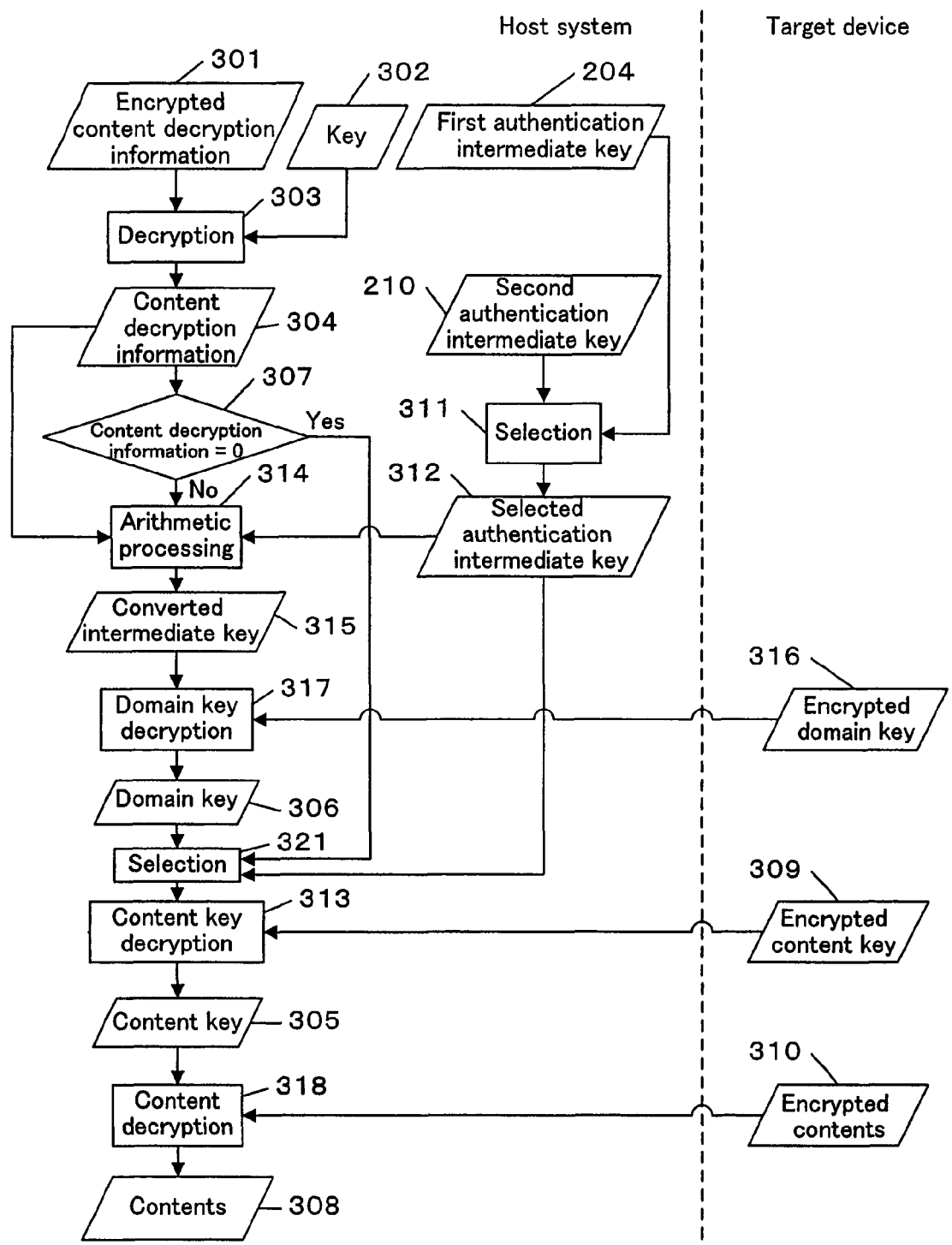
FIG. 6 is a flow chart showing a decryption process according to the first embodiment.

When authentication has succeeded, a decryption process shown in FIG. 6 is performed.

In a selection process 311, the selector 401 (shown in FIG. 4) selects the second authentication intermediate key 210, if the second authentication intermediate key 210 has been generated. On the other hand, if the second authentication intermediate key 210 has not been generated, the selector 401 selects the first authentication intermediate key 204. The selected key is used as a selected authentication intermediate key 312.

In a decryption process 303, the decryption circuit 402 reads a key 302 and one of a plurality of encrypted content decryption information sets 301, which are selected, e.g., in accordance with the application to be executed, from a register (not shown) which is in the confidential information processing section 105 and the secrecy of which is secured. The decryption circuit 402 then performs a decryption process to output content decryption information 304. In the decryption process 303, the key 302 may be common to the encrypted content decryption information sets 301 or may be selected in the manner described above.

The content decryption information 304 indicates a content data decryption procedure (that is, indicates which one of a plurality of decryption procedures that the confidential information processing section 105 can perform will be used to decrypt the encrypted contents), while the content decryption information 304 is used in the decryption process.

Specifically, if the content decryption information 304 has a value other than "0", the arithmetic circuit 403 performs arithmetic processing 314 according to a determination process 307 and converts the selected authentication intermediate key 312 by performing the certain arithmetic processing (e.g., one-way function processing) in which arithmetic operations using the value of the content decryption information 304 are performed, whereby a conversion intermediate key 315 is generated. The domain key decryption circuit 404 performs a domain key decryption process 317 in which the domain key decryption circuit 404 reads an encrypted domain key 316 from the target device 101 and decrypts the encrypted domain key 316 using the conversion intermediate key 315, and outputs a domain key 306. The selector 405 performs a selection process 321 in which not the selected authentication intermediate key 312 but the domain key 306 is selected and output, in accordance with the fact that the content decryption information 304 is not "0".

On the other hand, if the content decryption information 304 is "0", the arithmetic circuit 403 and the domain key decryption circuit 404 do not perform any processing (i.e., do not perform the arithmetic processing 314 and the domain key decryption process 317 and outputs an undefined value, for example) in accordance with the determination process 307. The selector 405 performs the selection process 321 in which the selected authentication intermediate key 312 output from the selector 401 is selected and output.

The content key decryption circuit 406 performs a content key decryption process 313, in which the content key decryption circuit 406 reads an encrypted content key 309 from the target device 101 and decrypts the encrypted content key 309 using the domain key 306 or the selected authentication intermediate key 312, which has been selected by the selector 405, and outputs a content key 305.

The content decryption circuit 407 performs a content decryption process 318, in which the content decryption circuit 407 reads encrypted contents 310 from the target device 101 and decrypts the encrypted contents 310 using the content key 305, and outputs plaintext contents 308 from the confidential information processing section 105 that is a hidden hardware area. The output contents 308 are used for audio and video playback, for example.

As described above, depending on whether or not the encrypted domain key 316 is used, the decryption procedure is performed either in three steps or in two steps, and the contents of the decryption arithmetic operation, i.e., the key selection method and the key generation method, are changed. The decryption procedure and the contents of the decryption arithmetic operation are determined based on the decryption information. Therefore, for example, if decryption information indicating two-step decryption is used for encrypted data that should be decrypted in three steps, the contents of the decryption arithmetic operation themselves will not be performed properly. It is therefore possible to easily prevent the intermediate data from being illegitimately obtained by execution of a fraudulent processing procedure.

If a mechanism for changing the number of decryption processes according to the value of the content decryption information 304 is provided for the sequences executed by the confidential information processing section 105, external output of the confidential information is prevented.

Also, if the value of the content decryption information 304 itself is encrypted and implemented, it becomes more difficult to fraudulently rewrite the content decryption information 304 for external output of the confidential information.

However, the content decryption information 304 does not necessarily have to be encrypted. Even in cases in which the content decryption information 304 is not encrypted, the effect of preventing fraudulent acquisition of the content key and the like can be achieved by the fact that the processing procedure does not correspond to the arithmetic operation, the key selection, and the like. This effect can be also achieved in cases where the content decryption information 304 is input from outside the processor.

The content decryption information 304 may also contain information that indicates which key is to be used in decryption of the encrypted contents, and IDs of carriers.

Second Embodiment of the Present Invention

Figure 7:
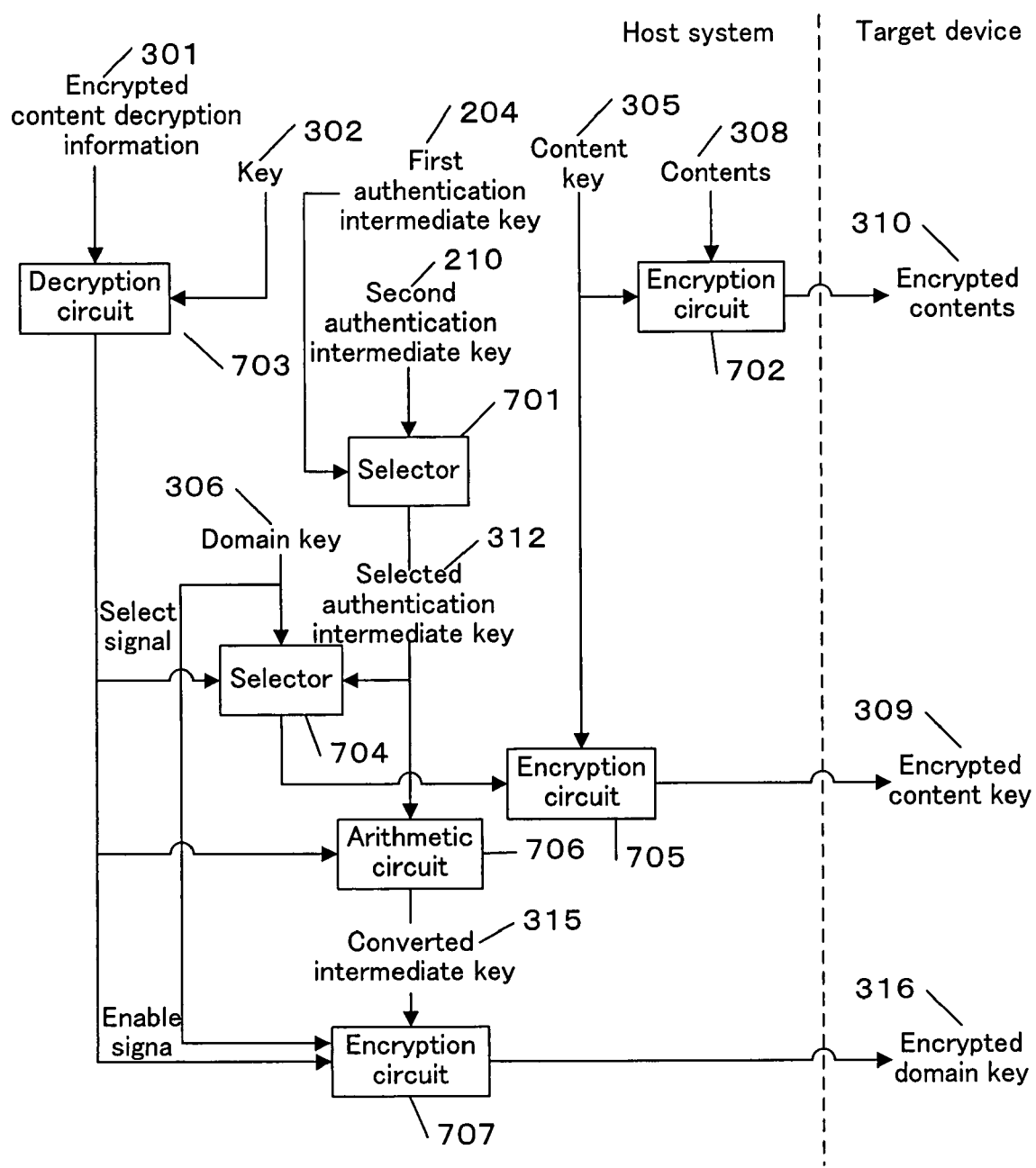
FIG. 7 is a block diagram showing the structure of a confidential information processing section 105 according to a second embodiment.
Figure 8:
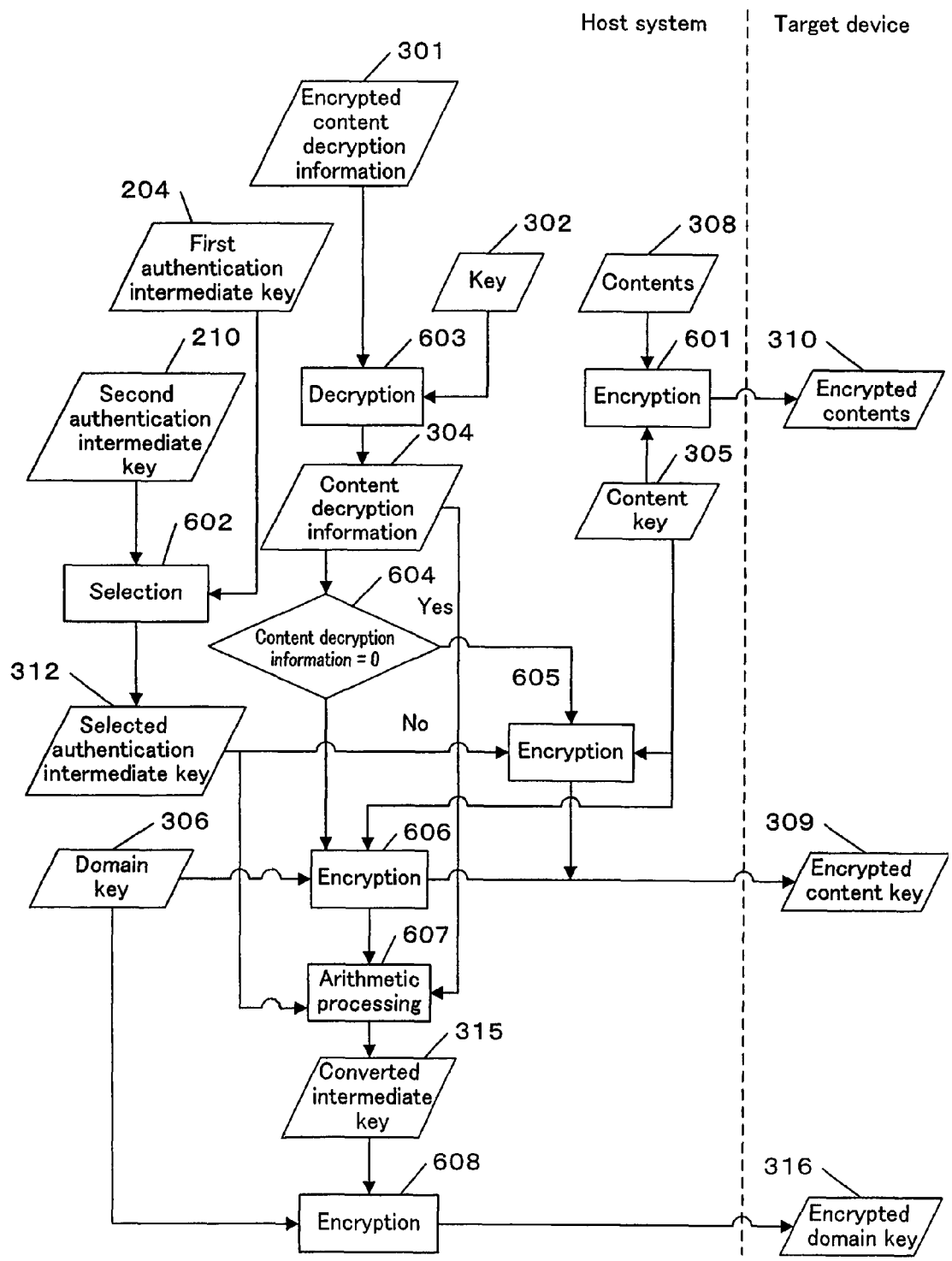
FIG. 8 is a flow chart showing an encryption process according to the second embodiment.

A description will be made of an example of a confidential information processor which generates encrypted contents 310, an encrypted content key 309, and an encrypted domain key 316 such as described in the first embodiment. The entire structure of this confidential information processor is substantially the same as that of the first embodiment (shown in FIG. 1), and the configuration of, and the contents of processing by, a confidential information processing section 105 with respect to an encryption process are as shown in FIGS. 7 and 8.

When encryption is performed in this confidential information processor, the same authentication process (shown in FIG. 5) as that of the first embodiment is first performed.

In a case where the authentication between a target device 101 and a host system 102 has succeeded, the host system 102 encrypts contents 308, a content key 305, and a domain key 306 and transmits the encrypted data to the target device 101, where the transmitted data is stored.

To be more specific, an encryption circuit 702 uses the content key 305 to encrypt the contents 308 (in an encryption process 601) and stores the encrypted contents 310 in a third region 503 (which is an area that can be accessed freely) in the target device 101.

Also, if a second authentication intermediate key 210 has been generated by the authentication process, a selector 701 selects the second authentication intermediate key 210, and if the second authentication intermediate key 210 has not been generated, the selector 701 selects a first authentication intermediate key 204. The selector 701 then outputs the selected key as a selected authentication intermediate key 312 (in a selection process 602).

A decryption circuit 703 decrypts with a key 302 (in a decryption process 603) one of a plurality of encrypted content decryption information sets 301, which is selected according to, e.g., the application to be executed, to obtain content decryption information 304.

Based on the value of the obtained content decryption information 304, a selector 704 determines whether the selected authentication intermediate key 312 or the domain key 306 will be used as the key for encrypting the content key 305 and makes a selection (in a determination process 604).

That is, when the value of the content decryption information 304 is "0", the key for encrypting the content key 305 is the selected authentication intermediate key 312, and when the value of the content decryption information 304 is other than "0", the key for encrypting the content key 305 is the domain key 306.

Therefore, when the value of the content decryption information 304 is "0", an encryption circuit 705 encrypts the content key 305 with the selected authentication intermediate key 312 (in an encryption process 605). On the other hand, when the value of the content decryption information 304 is not "0", the encryption circuit 705 encrypts the content key 305 with the domain key 306 (in an encryption process 606). The encryption circuit 705 then transmits the obtained encrypted content key 309 to the target device 101, so that the encrypted content key 309 is stored in a second region 502 (which is a region that cannot be accessed unless the authentication has succeeded) or in a third region 503 (which is a region that can be freely accessed).

When the value of the content decryption information 304 is not "0", an arithmetic circuit 706 receives the content decryption information 304 and the selected authentication intermediate key 312 to perform arithmetic processing 607, thereby generating a conversion intermediate key 315. The arithmetic processing 607 is carried out by performing arithmetic operations that are the same as, or correspond to, the arithmetic processing 314 described in the first embodiment. An encryption circuit 707 encrypts the domain key 306 with the conversion intermediate key 315 (in an encryption process 608) and transmits the obtained encrypted domain key 316 to the target device 101, so that the encrypted domain key 316 is stored in the second region 502. When the value of the content decryption information 304 is "0", the arithmetic circuit 706 and the encryption circuit 7007 existing in the later stages do not operate.

As a result of the execution of the encryption process described above, the respective data sets are stored in the regions in the target device 101 in the state shown in FIG. 2 or 3.

It should be noted that the various exemplary modifications described in the first embodiment are also applicable to this embodiment. Furthermore, the structures described in the first and second embodiments may be combined into a processor that is capable of both encryption and decryption.

Modified Example of the First and Second Embodiments of the Present Invention

The first authentication intermediate key obtainable when the authentication has succeeded may be also generated in the target device. Alternatively, the first authentication intermediate key may be stored in the target device in advance. If the target device has the first authentication intermediate key, a session key can be defined as an advanced function. A session key is a key used for re-encryption of confidential information input/output between the target device and the host system. Such double encryption increases the confidentiality further. The specific procedure of the double encryption will be described below.

In cases where a session key is applied to the decryption method of the first embodiment, the target device performs given function processing, which is called session processing, on the first authentication intermediate key 204 stored beforehand in the target device or generated as a result of authentication, thereby generating a session key. If the encrypted domain key 316 has been stored, the target device doubly encrypts the encrypted domain key 316 with the generated session key. If the encrypted domain key 316 is not stored, the target device doubly encrypts the encrypted content key 309 with the generated session key. And the target device outputs the double-encrypted key to the host system.

On the other hand, the host system uses the first authentication intermediate key 204 generated by authentication, to perform session processing, thereby producing a session key. When the value of the content decryption information 304 is "0", the host system decrypts, using the session key, the encrypted content key doubly encrypted with the session key read from the target device, thereby obtaining the encrypted content key 309. When the value of the content decryption information 304 is other than "0", the host system decrypts, using the session key, the encrypted domain key doubly encrypted with the session key read from the target device, thereby obtaining the encrypted domain key 316. The subsequent process is the same as that of the first embodiment and descriptions thereof are thus omitted herein.

In cases where a session key is applied to the encryption method of the second embodiment, the host system uses the first authentication intermediate key 204 generated by authentication, to perform session processing, thereby generating a session key. When the value of the content decryption information 304 is "0", the host system doubly encrypts the encrypted content key 309 with the generated session key. When the value of the content decryption information 304 is other than "0", the host system doubly encrypts the encrypted domain key 316 with the generated session key. The host system then outputs the double-encrypted key to the target device.

On the other hand, the target device uses the first authentication intermediate key 204 stored in advance therein or generated by authentication, to perform, session processing, thereby producing a session key. When the double-encrypted content key is output from the host system, the target device decrypts this key with the session key to generate the encrypted content key 309 and stores the encrypted content key 309 in the second region 502. When the double-encrypted domain key is output from the host system, the target device decrypts this key with the session key to generate the encrypted domain key 316 and stores the encrypted domain key 316 in the second region.

As described above, the double encryption with the session key provides more reliable protection of the highly confidential domain key or content key, thereby further increasing the confidentiality.

Third Embodiment of the Present Invention

Figure 9:
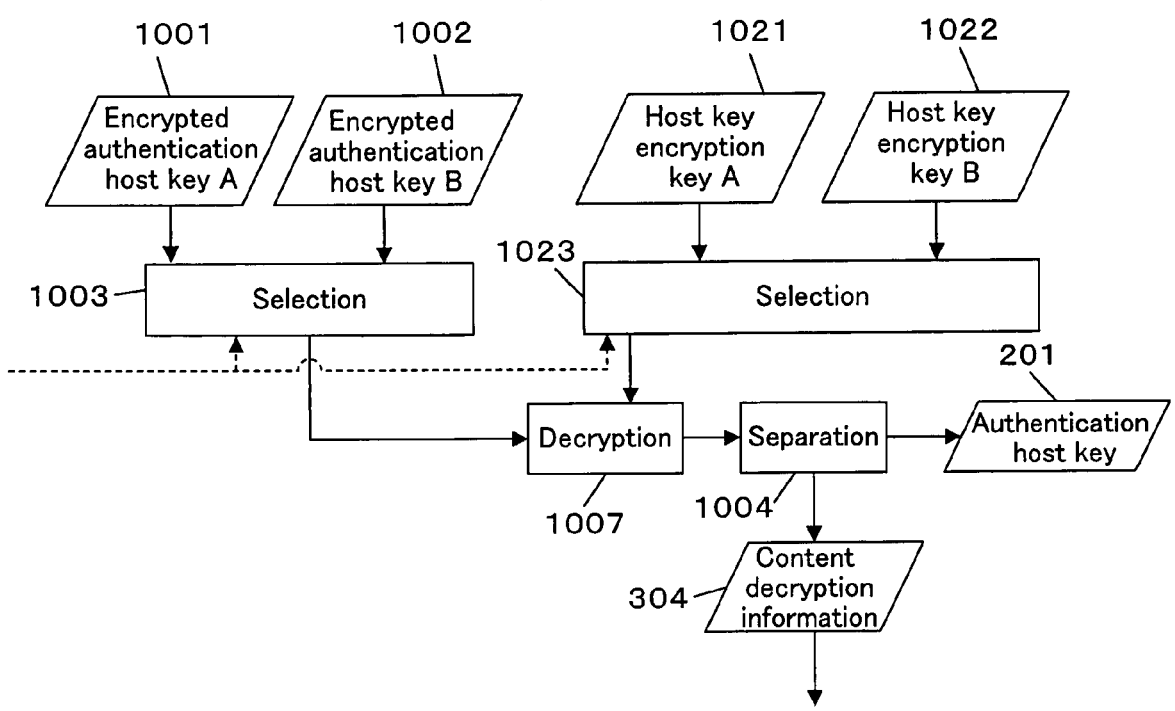
FIG. 9 is a flow chart showing an authentication key determination process according to a third embodiment.
Figure 10:
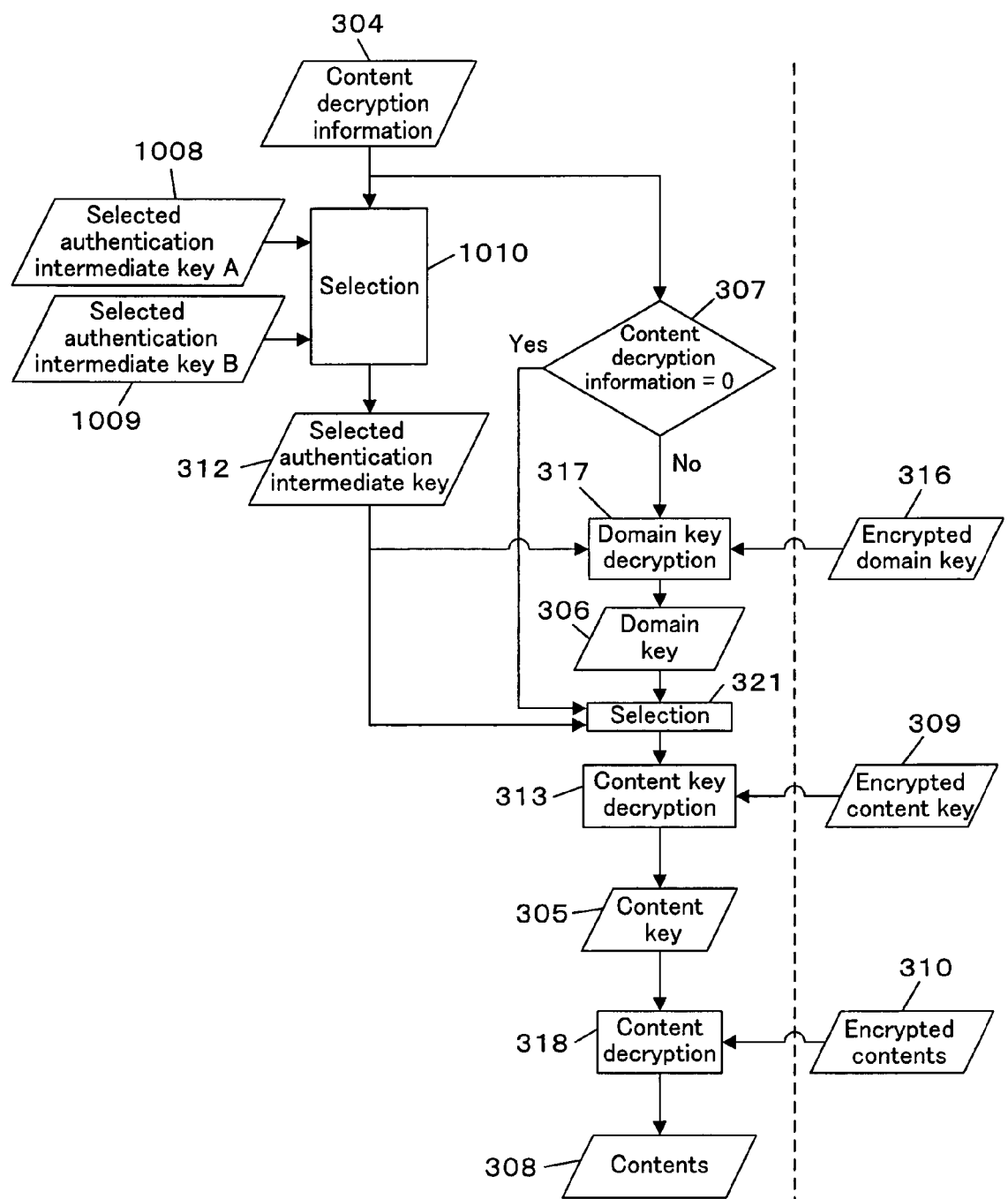
FIG. 10 is a flow chart showing a decryption process according to the third embodiment.

In a confidential information processor according to a third embodiment, an authentication host key and an authentication target key used in authentication between a target device and a host system are defined for each of the applications, and according to the application to be executed by the host system, one of the authentication host keys and one of the authentication target keys are selected to perform authentication. The entire structure of this confidential information processor is also substantially the same as that of the first embodiment (shown in FIG. 1). FIGS. 9 and 10 show the configuration of, and the contents of processing by, a confidential information processing section 105 with respect to authentication key determination and decryption process.

For example, in cases where the host system deals with audio contents and delivery contents, two kinds of authentication must be performed for audio and delivery.

Therefore, when the host system deals with contents for a first application and contents for a second application, two keys, i.e., a first authentication intermediate key for the first application and a first authentication intermediate key for the second application are generated by performing authentication for each application.

Furthermore, if there is a second authentication target key for the first application, a second authentication intermediate key for the first application is generated, and if there is a second authentication target key for the second application, a second authentication intermediate key for the second application is generated.

Hereinafter, the first authentication intermediate key for the first application will be referred to as a "first authentication intermediate key A"; the second authentication intermediate key for the first application to a "second authentication intermediate key A"; the first authentication intermediate key for the second application to a "first authentication intermediate key B"; and the second authentication intermediate key for the second application to a "second authentication intermediate key B". Whether the host system uses the first authentication intermediate key or the second authentication intermediate key is determined as follows: if the second authentication intermediate key has been generated, the host system selects the second authentication intermediate key, and if the second authentication intermediate key has not been generated, the host system selects the first authentication intermediate key. The selected key is used as a selected authentication intermediate key. Hereinafter, the selected authentication intermediate key for the first application will be referred to as a "selected authentication intermediate key A", and the selected authentication intermediate key for the second application will be referred to as a "selected authentication intermediate key B".

In a case where the authentication between the target device and the host system has succeeded in the authentication method described above, the host system reads an encrypted domain key, an encrypted content key, and encrypted contents from the target device and decrypts the encrypted contents. Whether or not a domain key is established for the contents for the decryption thereof is determined by the value of content decryption information. The value of the content decryption information is defined for each application, and according to the value of the content decryption information, the host system determines whether the selected authentication intermediate key or the domain key is the key for encrypting the content key. For example, if the value of the content decryption information is "0" in the first application and the value of the content decryption information is not "0" in the second application, the key for encrypting the content key is the selected authentication intermediate key in the first application and the key for encrypting the content key is the domain key in the second application.

FIG. 9 is a flowchart showing a method for obtaining content decryption information according to the third embodiment of the present invention.

As described above, an authentication host key is defined for each application. Hereinafter, the authentication host key for the first application will be referred to as an "authentication host key A" and the authentication host key for the second application will be referred to as an "authentication host key B". An encrypted authentication host key A 1001 and an encrypted authentication host key B 1002 are each configured by concatenating an authentication host key 201 and content decryption information 304 and then encrypting the concatenated data. Then, the encrypted authentication host key A 1001 or the encrypted authentication host key B 1002 is selected as the encrypted authentication host key corresponding to the application to be executed (in a selection process 1003), decrypted (in a decryption process 1007) using either a host key encryption key A 1021 or a host key encryption key B 1022, which has been selected (in a selection process 1023), and separated (in a separation process 1004), whereby the authentication host key 201 and the content decryption information 304 for that application are obtained. The authentication process (shown in FIG. 5) described in the first embodiment and the selection process 311 shown in FIG. 6 are performed using the above-described authentication host key 201, thereby obtaining a selected authentication intermediate key A 1008 and a selected authentication intermediate key B 1009 shown in FIG. 10.

Then, either the selected authentication intermediate key A 1008 or the selected authentication intermediate key B 1009 is selected as the authentication intermediate key for the application to be executed (in a selection process 1010) according to the value of the content decryption information 304 obtained in the separation process 1004 of the encrypted authentication host key (or according to the same selection information as that of the selection processes 1003 and 1023). The selected key is used as a selected authentication intermediate key 312. (It should be noted that in practical cases, only a single authentication intermediate key may be generated by the authentication process in which the authentication host key 201 corresponding to the application to be executed is used, so that the selection process 1010 is not required.)

The decryption process performed based on the selected authentication intermediate key 312 and the content decryption information 304 is the same as that of the first embodiment (shown in FIG. 6) except that the conversion intermediate key 315 is not generated by the arithmetic processing 314. In this case, the arithmetic processing 314 based on the content decryption information 304 is not performed. However, the encrypted authentication host key is configured by the concatenation of the authentication host key 201 and the content decryption information 304, whereby the value of the content decryption information 304 is determined in the semiconductor integrated circuit at the time of completion of the authentication, and the selection of the authentication intermediate key is determined according to the value of the content decryption information 304 and cannot be changed by the host CPU. Therefore, even if the host system attempts to fraudulently acquire the content key by, e.g., falsifying the application and applying a decryption process for contents that require two-step decryption to a decryption process for the contents that require three-step decryption, the appropriate selected authentication intermediate key 312 will not be used in the decryption process. The decryption in the content key decryption process 313 will not be thus performed correctly, whereby the confidentiality of the content key is secured.

It should be noted that the generation of the conversion intermediate key 315 by the arithmetic processing 314 may also be performed.

Also, an encrypted authentication host key generated by concatenating content decryption information 304 to an already encrypted authentication host key 201 may be used. Such an encrypted authentication host key is decrypted after the separation of the content decryption information 304.

Fourth Embodiment of the Present Invention

Figure 11:
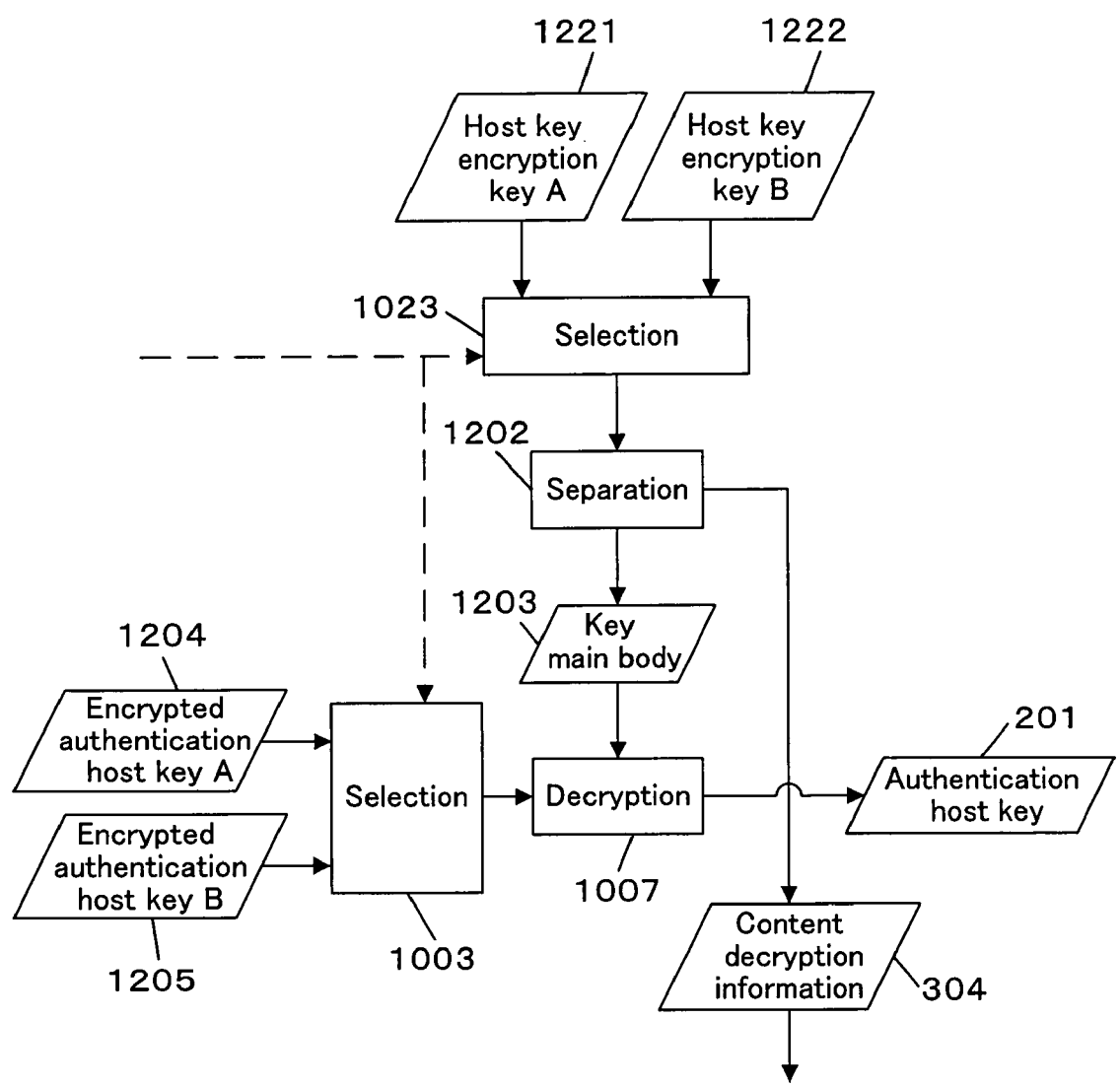
FIG. 11 is a flow chart showing an authentication key determination process according to a fourth embodiment.

Content decryption information 304 may be contained in a host key encryption key for decrypting an encrypted authentication host key, unlike in the third embodiment in which the content decryption information 304 is concatenated to the authentication host key. More specifically, a process shown in FIG. 11 may be performed instead of the process shown in FIG. 9.

Host key encryption keys 1221 and 1222 are each configured by concatenating content decryption information 304 to a key main body 1203. By separation of the content decryption information 304 from the host key encryption key 1221 or 1222 (in a separation process 1202), the key main body 1203 and the content decryption information 304 are obtained.

An encrypted authentication host key A 1204 and an encrypted authentication host key B 1205 have been encrypted with the key main body 1203, and either the encrypted authentication host key A 1204 or the encrypted authentication host key B 1205 is selected as an encrypted authentication host key corresponding to the application (in a selection process 1003) and the selected encrypted authentication host key is decrypted with the key main body 1203 (in a decryption process 1007), thereby obtaining the authentication host key 201 for that application.

In the above case, the value of the content decryption information is also determined in the semiconductor integrated circuit at the time of completion of the authentication, and the authentication intermediate key selection is uniquely determined according to the value of the content decryption information, whereby fraudulent acquisition of the content key is prevented.

Fifth Embodiment of the Present Invention

Figure 12:
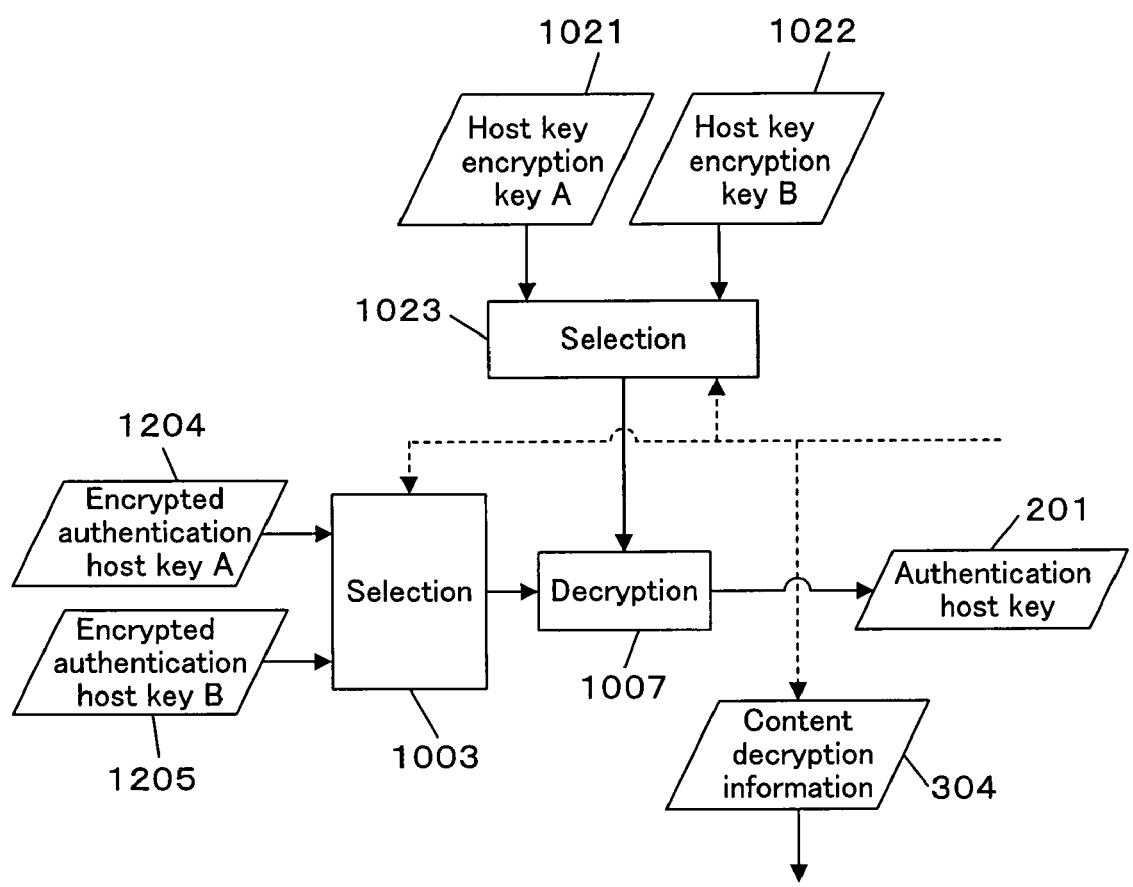
FIG. 12 is a flow chart showing an authentication key determination process according to a fifth embodiment.

As shown in FIG. 12, encrypted authentication host keys and host key encryption keys do not contain content decryption information, and information itself that indicates selection of a host key encryption key A 1021 or B 1022 (or an encrypted authentication host key A 1204 or B 1205) is used as (or associated with) the content decryption information. This also allows the authentication intermediate key selection to be uniquely determined according to the value of the content decryption information. It is therefore possible to prevent the content key from being obtained fraudulently.

Sixth Embodiment of the Present Invention

Figure 13:
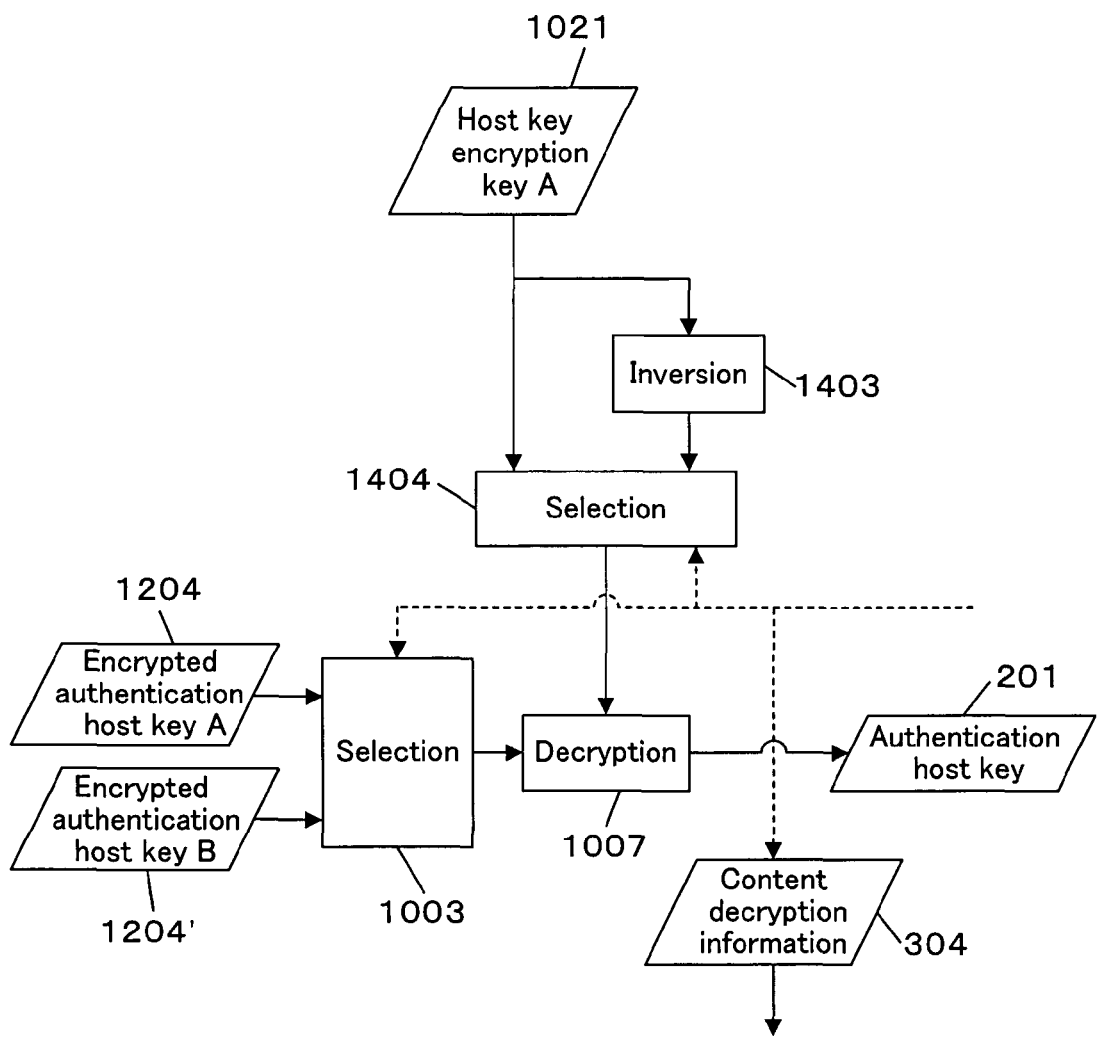
FIG. 13 is a flow chart showing an authentication key determination process according to a sixth embodiment.

In cases where there are two kinds of applications, for example, a host key encryption key A 1021, a key obtained by inversion of the host key encryption key A 1021 (in an inversion process 1403), and encrypted authentication host keys A 1204 and B 1204' encrypted by these keys may be used as shown in FIG. 13, unlike in the fifth embodiment in which the two host key encryption keys 1221 and 1222 are used. In this case, fraudulent acquisition of the content key is also prevented, while the key management can be simplified.

Seventh Embodiment of the Present Invention

Figure 14:
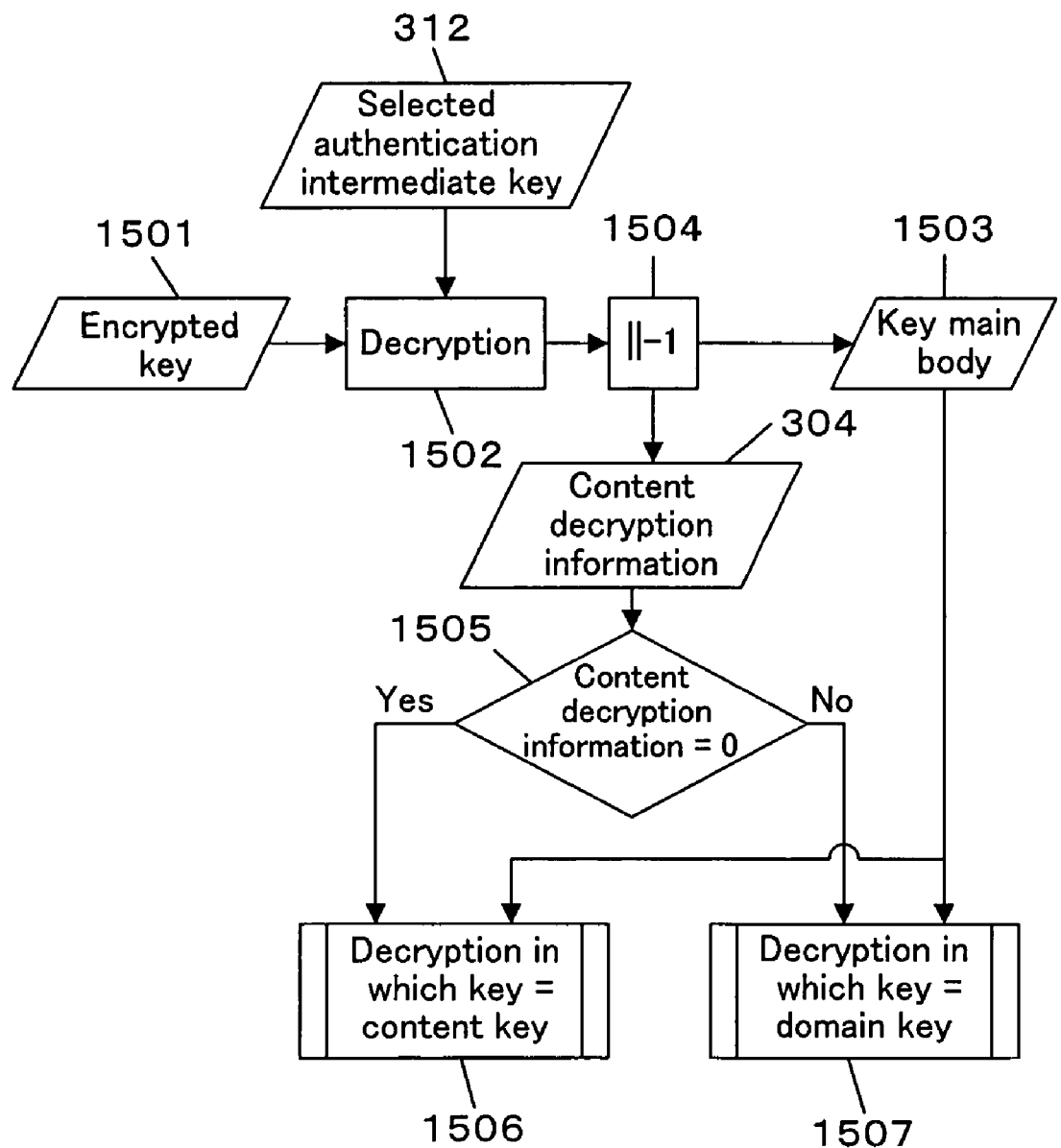
FIG. 14 is a flow chart showing an authentication key determination process according to a seventh embodiment.

The present invention is not limited to the configuration in which the content decryption information is contained in the authentication host key or the host key encryption key as in the third to sixth embodiments, but the content decryption information may be contained in an encrypted content key or an encrypted domain key itself. Specifically, as shown in FIG. 14, in a confidential information processor according to this embodiment, an encrypted key 1501 provided from a target device 101 is decrypted with a selected authentication intermediate key 312 (in a decryption process 1502) and content-decryption information 304 and a key main body 1503 are separated (in a separation process 1504). In accordance with a determination as to whether or not the content decryption information 304 is "0" (in a determination process 1505), decryption of encrypted contents (decryption process 1506), in which the key main body 1503 is used as a content key, or decryption of an encrypted content key and encrypted contents (decryption process 1507), in which the key main body 1503 is used as a domain key, is performed. This also prevents fraudulent acquisition of the content key.

Eighth Embodiment of the Present Invention

Figure 15:
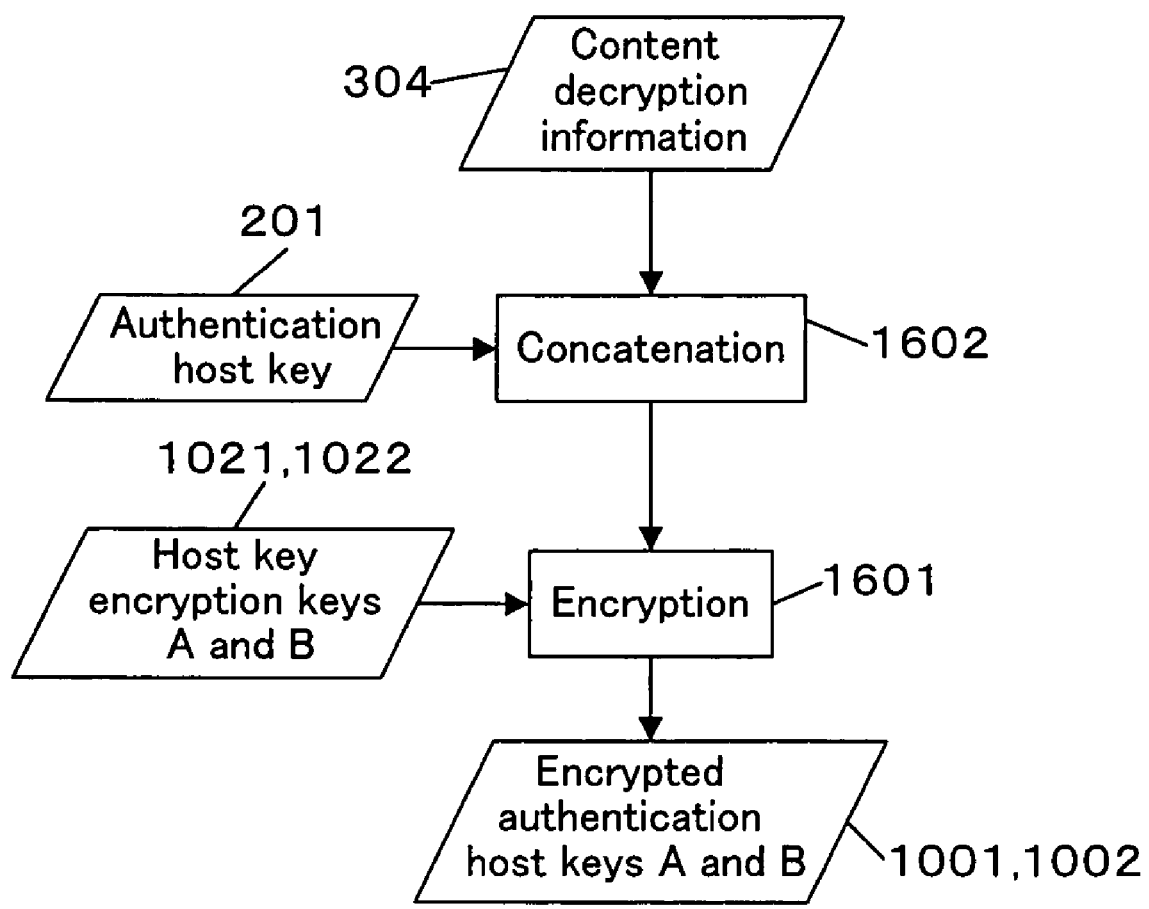
FIG. 15 is a flow chart showing an encrypted authentication host key generation process according to an eighth embodiment.

The encrypted authentication host keys A 1001 and B 1002 described in the third embodiment (shown in FIG. 9) can be generated by a process shown in FIG. 15, for example. After the concatenation of content decryption information 304 to each authentication host key 201 (in a concatenation process 1602), the authentication host keys are encrypted using host key encryption keys 1021 and 1022 (in an encryption process 1601) to generate encrypted authentication host keys A 1001 and B 1002. The value of the content decryption information 304 is defined for each application.

Ninth Embodiment of the Present Invention

Figure 16:
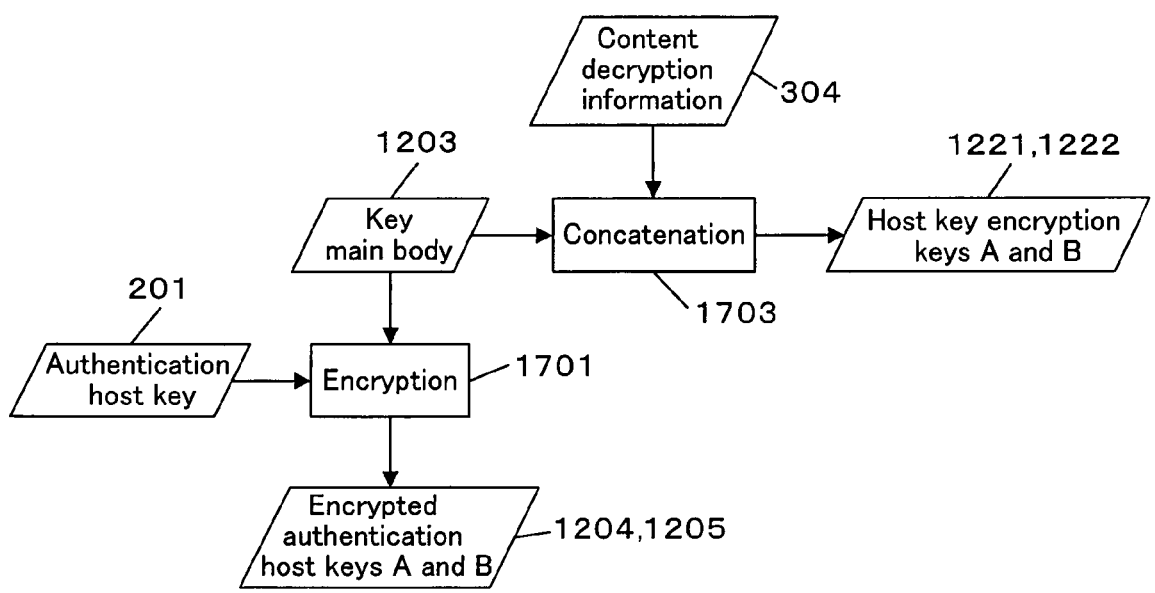
FIG. 16 is a flow chart showing an encrypted authentication host key generation process according to a ninth embodiment.

Also, the encrypted authentication host keys A 1204 and B 1205 and the host key encryption keys 1221 and 1222 described in the fourth embodiment of the present invention (shown in FIG. 11) may be generated by a process shown in FIG. 16, for example. Specifically, authentication host keys 201 are each encrypted with a key main body 1203 (in an encryption process 1701) to generate encrypted authentication host keys A 1204 and B 1205. And each content decryption information 304 is concatenated to the key main body 1203 (in a concatenation process 1703) to generate host key encryption keys 1221 and 1222.

Tenth Embodiment of the Present Invention

Figure 17:
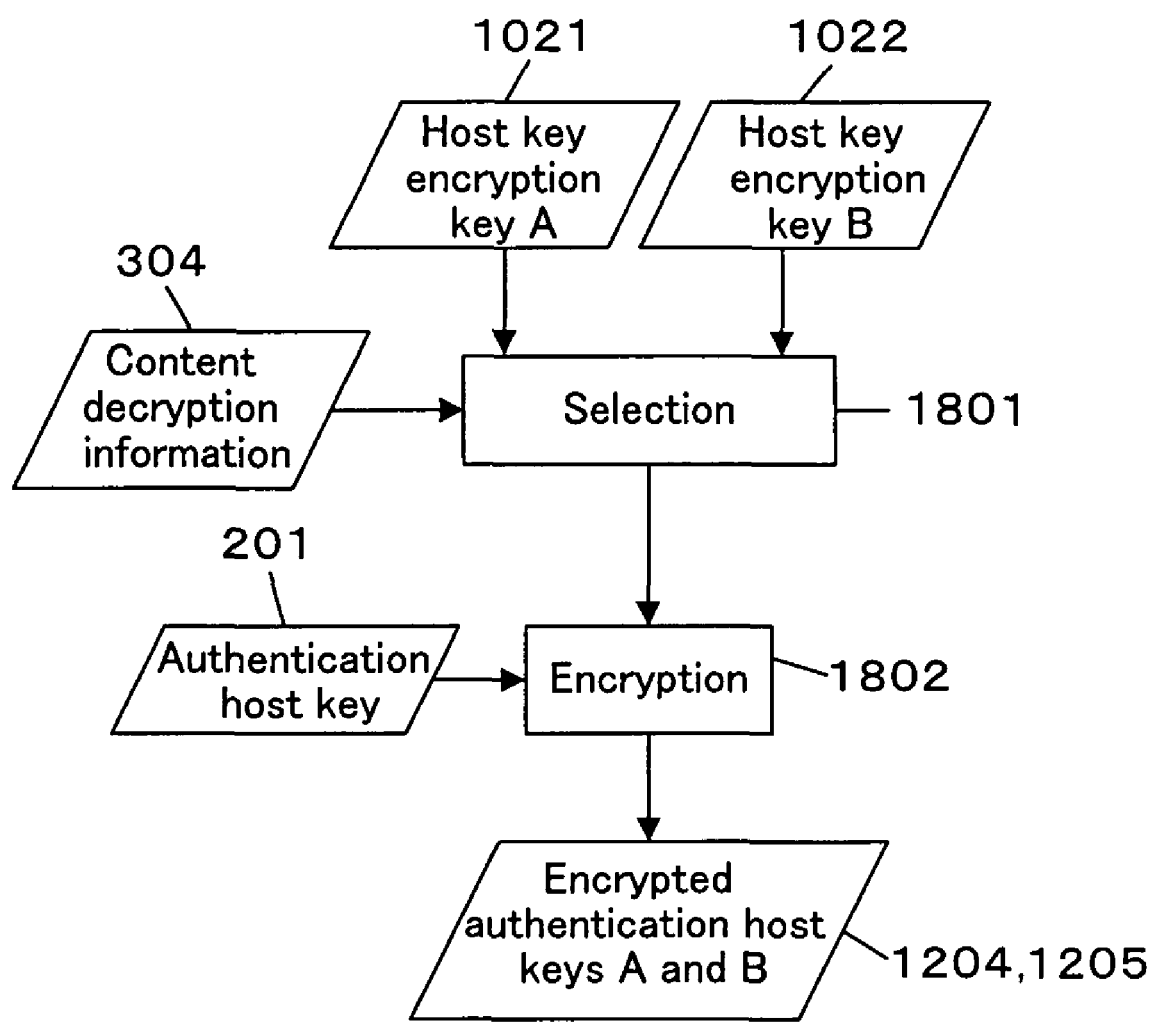
FIG. 17 is a flow chart showing an encrypted authentication host key generation process according to a tenth embodiment.

Furthermore, the encrypted authentication host keys A 1204 and B 1205 described in the fifth embodiment of the present invention (shown in FIG. 12) may be generated by a process shown in FIG. 17, for example. Specifically, either a host key encryption key A 1021 or B 1022 that corresponds to content decryption information 304 is selected (in a selection process 1801) and used to encrypt an authentication host key 201 (in an encryption process 1802), whereby the encrypted authentication host key A 1204 or B 1205 is generated.

Eleventh Embodiment of the Present Invention

Figure 18:
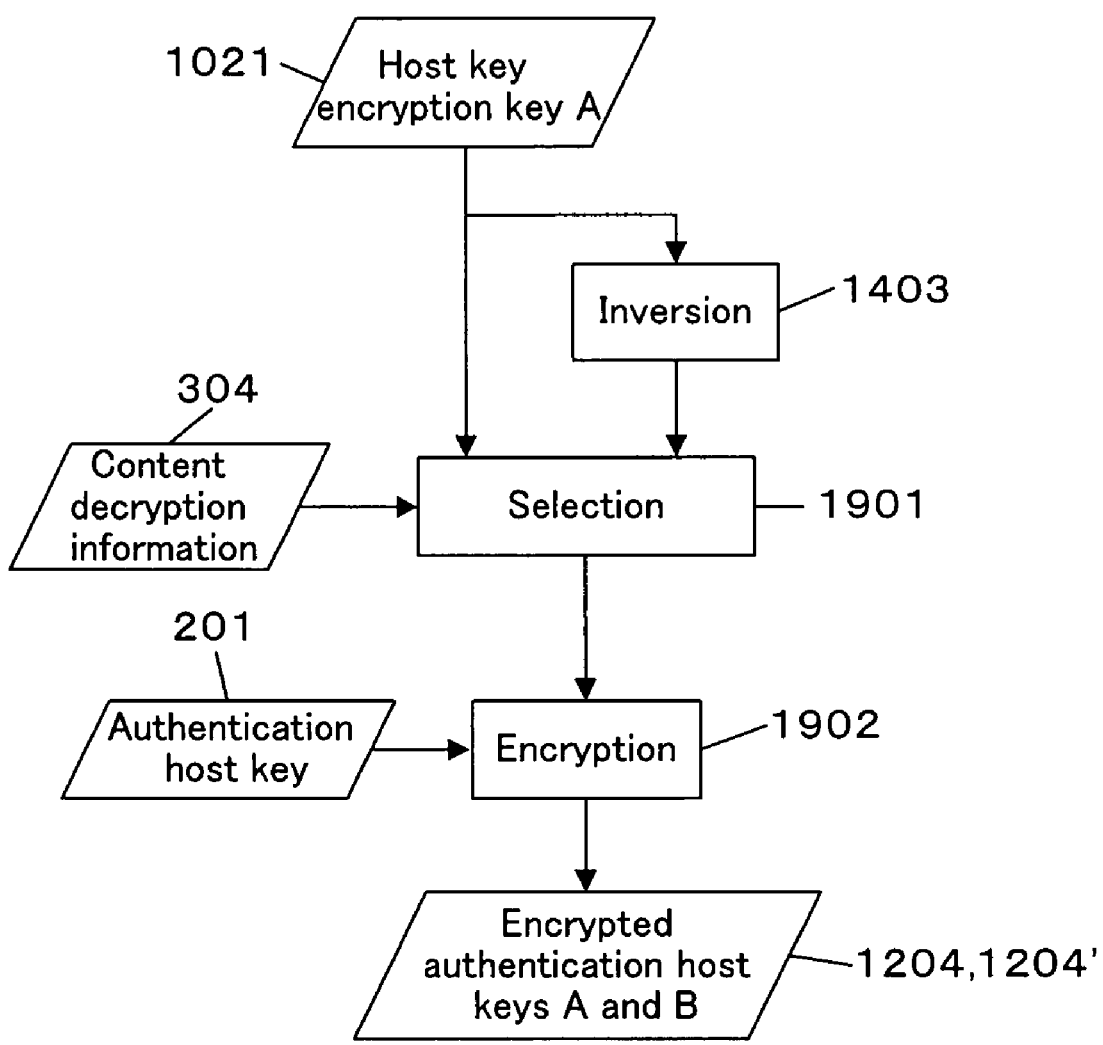
FIG. 18 is a flow chart showing an encrypted authentication host key generation process according to an eleventh embodiment.

Moreover, the encrypted authentication host keys A 1204 and B 1204' described in the sixth embodiment of the present invention (shown in FIG. 13) may be generated by a process shown in FIG. 18, for example. Specifically, in accordance with the value of content decryption information 304, either a host key encryption key A 1021 or a key obtained by inversion of the host key encryption key A 1021 (in an inversion process 1403) is selected (in a selection process 1901) and used to encrypt an authentication host key 201 (in an encryption process 1902), whereby the encrypted authentication host key A 1204 or B 1204' is generated.

In the first embodiment (shown in FIG. 4) and the like, exemplary cases in which decryption is performed by sequential operation of a plurality of decryption circuits have been described. Nevertheless, the decryption may be performed by repeatedly using a single decryption circuit.

In cases where a circuit serving as a decryption circuit is capable of functioning as an encryption circuit by using its input as its output and its output as its input, the decryption circuit may also act as an encryption circuit.

INDUSTRIAL APPLICABILITY

The confidential information processing methods according to the present invention have the effect of maintaining the confidentiality of information at a high level even in cases where a confidential information processor, in which multiple types of decryption sequences are applicable, is used. The inventive confidential information processing methods are therefore effective, e.g., as confidential information processing methods for decrypting, by a specified host system owned by each user, encrypted contents stored by the user in a target device via electronic delivery or the like, or as confidential information processing methods for storing, in the target device, contents encrypted by the specified host system owned by the user.

The invention claimed is:

1. A confidential information processing method for decrypting, in a host system, encrypted content data obtained by encryption of content data with a content key and stored in a target device, the method comprising:
   the mutual authentication step of performing mutual authentication between the host system and the target device; and
   the decryption step of, when the mutual authentication has succeeded, decrypting the encrypted content data in accordance with decryption information and the content key by a confidential information processing section, the decryption information indicating a procedure for the decryption of the encrypted content data and relating to contents of an arithmetic operation performed in the decryption of the encrypted content data,
   wherein in the decryption step, a decryption procedure that is performed in the number of stages selected according to the decryption information is carried out, the decryption procedure being selected from a plurality of decryption procedures including:
   a two-stage decryption procedure that is performed in two stages, in which the encrypted content data is decrypted with the content key and an encrypted content key obtained by encryption of the content key is decrypted with an intermediate key; and one or more decryption procedures that are performed in three or more stages,
   wherein in a three-stage decryption procedure that is performed in three stages, the two-stage decryption procedure is performed and an encrypted intermediate key obtained by encryption of the intermediate key is decrypted with a different intermediate key, and
   in a decryption procedure that is performed in four or more stages, the three-stage decryption procedure is performed and one or more other encrypted intermediate keys obtained by encryption of one or more other intermediate keys are decrypted with one or more still other intermediate keys.

2. The confidential information processing method of claim 1, wherein in the decryption step, according to the decryption information,
   either two-stage decryption, in which the encrypted content data is decrypted with the content key and the encrypted content key is decrypted with a first intermediate key, or
   three-stage decryption, in which the two-stage decryption is performed and an encrypted domain key obtained by encryption of a domain key serving as the first intermediate key is decrypted with a second intermediate key, is selectively performed.

3. The confidential information processing method of claim 2, wherein in the decryption step, the second intermediate key is generated by performing an arithmetic operation based on a third intermediate key and the decryption information.

4. The confidential information processing method of claim 1, wherein decryption results obtained by decryption operation performed in an intermediate stage, which is carried out before decryption operation performed in the last stage, is kept confidential within the host system.

5. The confidential information processing method of claim 1, wherein in the mutual authentication step, the mutual authentication is performed based on an encrypted authentication host key stored in the host system and an authentication target key stored in the target device, the encrypted authentication host key and the authentication target key each corresponding to the encrypted content data to be decrypted; and
   in the decryption step, the encrypted content data is decrypted based on either decryption information contained in results of decryption of the encrypted authentication host key or decryption information contained in a host key decryption key used in the decryption of the encrypted authentication host key.

6. The confidential information processing method of claim 1, wherein in the mutual authentication step, the mutual authentication is performed based on an encrypted authentication host key stored in the host system and an authentication target key stored in the target device, the encrypted authentication host key and the authentication target key each being selected in accordance with the encrypted content data to be decrypted; and
   in the decryption step, the encrypted content data is decrypted based on decryption information determined in accordance with the selection of the encrypted authentication host key or selection of a host key decryption key used in decryption of the encrypted authentication host key.

7. The confidential information processing method of claim 6, wherein as the host key decryption key, certain key data or key data obtained by inversion of bits in the certain key data is selected in accordance with the encrypted content data.

8. The confidential information processing method of claim 1, wherein the decryption information is contained either in the encrypted content key or in at least one of the encrypted intermediate keys.

9. The confidential information processing method of claim 1, wherein the encrypted content data, the encrypted content key, and each encrypted intermediate key are read from respective storage regions with different security levels in the target device or from different target devices.

10. The confidential information processing method of claim 1, wherein the encrypted content key and each encrypted intermediate key are read from first storage regions with the same security level in the target device, and the encrypted content data is read from a second storage region with a security level different from that of the first storage regions.

11. The confidential information processing method of claim 1, wherein the encrypted content data and the encrypted content key are read from first storage regions with the same security level in the target device, and each encrypted intermediate key is read from a second storage region with a security level different from that of the first storage regions.

12. The confidential information processing method of claim 1, wherein at least either the encrypted content key or one of the encrypted intermediate keys is doubly encrypted with a session key generated based on one of the intermediate keys.

13. A confidential information processing method for encrypting, in a host system, content data with a content key and storing the encrypted content data in a target device, the method comprising:

the mutual authentication step of performing mutual authentication between the host system and the target device;

the encryption step of, when the mutual authentication has succeeded, encrypting the content data in such a manner that the encrypted content data is decrypted in accordance with decryption information and the content key by a confidential information processing section, the decryption information indicating a procedure for the decryption of the encrypted content data and relating to contents of an arithmetic operation performed in the decryption of the encrypted content data; and the storage step of storing the encrypted content data in the target device, wherein in the encryption step, an encryption procedure that is performed in the number of stages selected according to the decryption information is carried out, the encryption procedure being selected from a plurality of encryption procedures including:

a two-stage encryption procedure that is performed in two stages, in which the content data is encrypted with the content key and the content key is encrypted with an intermediate key, and one or more encryption procedures that are performed in three or more stages, wherein in a three-stage encryption procedure that is performed in three stages, the two-stage encryption procedure is performed and the intermediate key is encrypted with a different intermediate key, and in an encryption procedure that is performed in four or more stages, the three-stage encryption procedure is performed and one or more other intermediate keys are encrypted with one or more still other intermediate keys.

* * * * *